FIG. 2.

INVENTORS
CHRIS ATSALOS
EMMANUEL ATSALOS
BY

ATTORNEYS

United States Patent Office 3,288,122
Patented Nov. 29, 1966

3,288,122
ENGINE
Chris Atsalos and Emmanuel Atsalos, San Diego, Calif., assignors of 12 percent to said Chris Atsalos, 54.67 percent to said Emmanuel Atsalos, and 33.33 percent to Steve S. Nicolaidis, San Diego, Calif.
Filed Feb. 25, 1964, Ser. No. 347,171
8 Claims. (Cl. 123—11)

The present invention relates to an improved engine.

Briefly, the engine described herein involves two piston assemblies movably mounted in a common cylinder housing. The cylinder housing is a rotatable structure connected to rotate about the same axis as the output shaft of the engine. The piston assemblies are rotatably supported about the same axis and each include generally an arcuate piston element. The cylinder housing and the output shaft connected thereto constantly rotate, and the pistons are alternately maintained stationary during a 90° rotating of the cylinder housing to develop a power stroke. When one of the piston assemblies is thus maintained stationary, the other piston assembly is caused to move faster than the cylinder housing to develop a compression stroke. Two different arrangements are described herein for causing such other piston assembly to move faster than the cylinder, one of such arrangements involving the use of a differential gear system between the piston assemblies, and the other arrangement involving the use of an oil field expansible chamber. The engine output shaft has two cams, one corresponding to each of the piston assemblies, and these cams are so arranged to operate a brake to brake or lock the corresponding piston and to substantially simultaneously fire a spark plug.

It is therefore a general object of the present invention to provide an engine constructed as indicated above.

A specific object of the present invention is to provide an improved engine which is relatively simple, eliminates the need of a crankshaft and camshaft.

Another specific object of the present invention is to provide an engine of this character in which the shaft rides on sealed bearings.

Another specific object of the present invention is to provide an engine of this character which essentially has only one valve per cylinder.

Another specific object of the present invention is to provide an engine of this character which has few moving parts.

Another specific object of the present invention is to provide an engine of this character for achieving low fuel consumption, yet high horsepower, in small size.

Another specific object of the present invention is to provide an engine of this character in which forces are generally rotary forces which may be balanced.

Another specific object of the present invention is to provide an engine of this character which is applicable for use in different fields, such as a gas air mixture, diesel fuel, or expansible fluid such as steam.

Another specific object of the present invention is to provide an engine of this character in which the fuel mixture is introduced through the rotating output shaft.

Another specific object of the present invention is to provide an engine of this character using timing mechanism which is adjustable.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

*Stationary parts*

Figure 1:
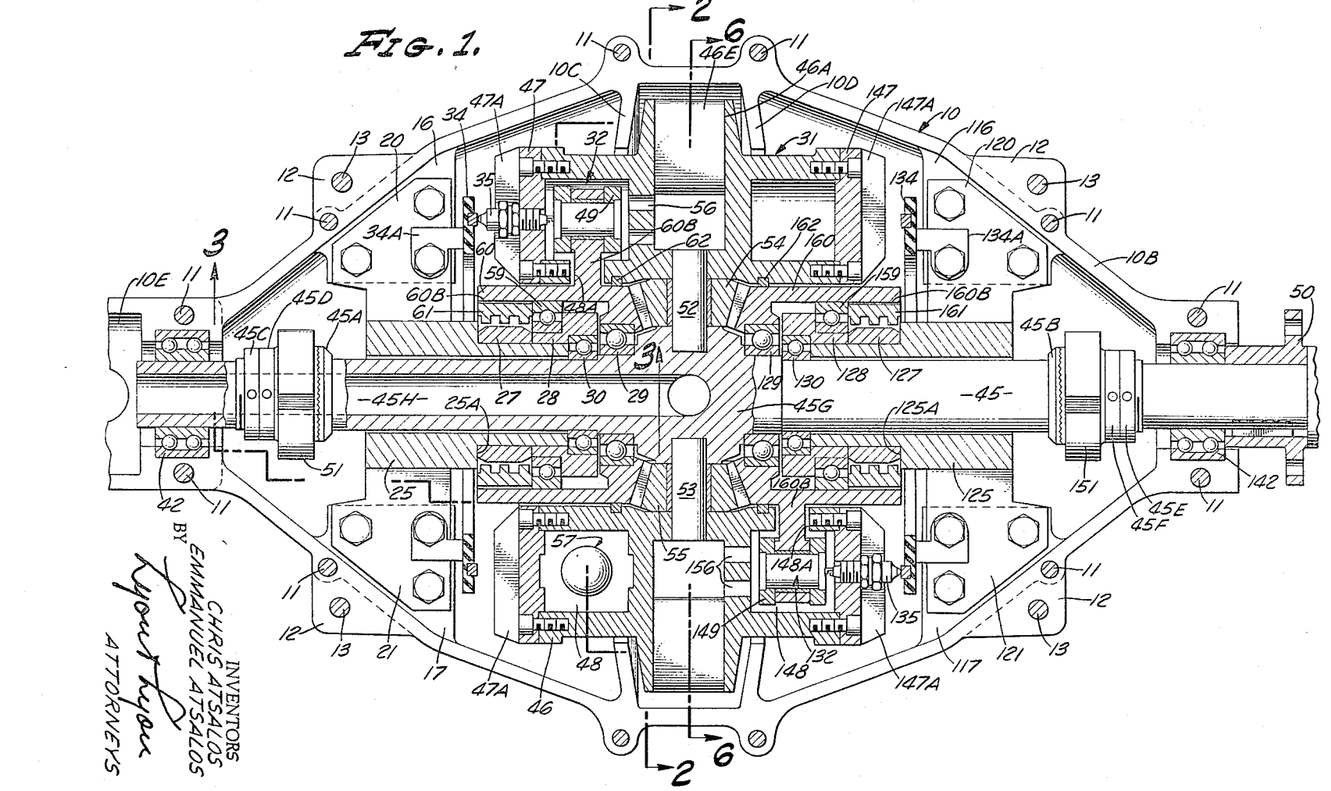
FIG. 1 is in general a transverse sectional view through an engine embodying features of the present invention and corresponds substantially to a section taken, as indicated, along the line 1—1 in FIG. 2.
Figure 2:
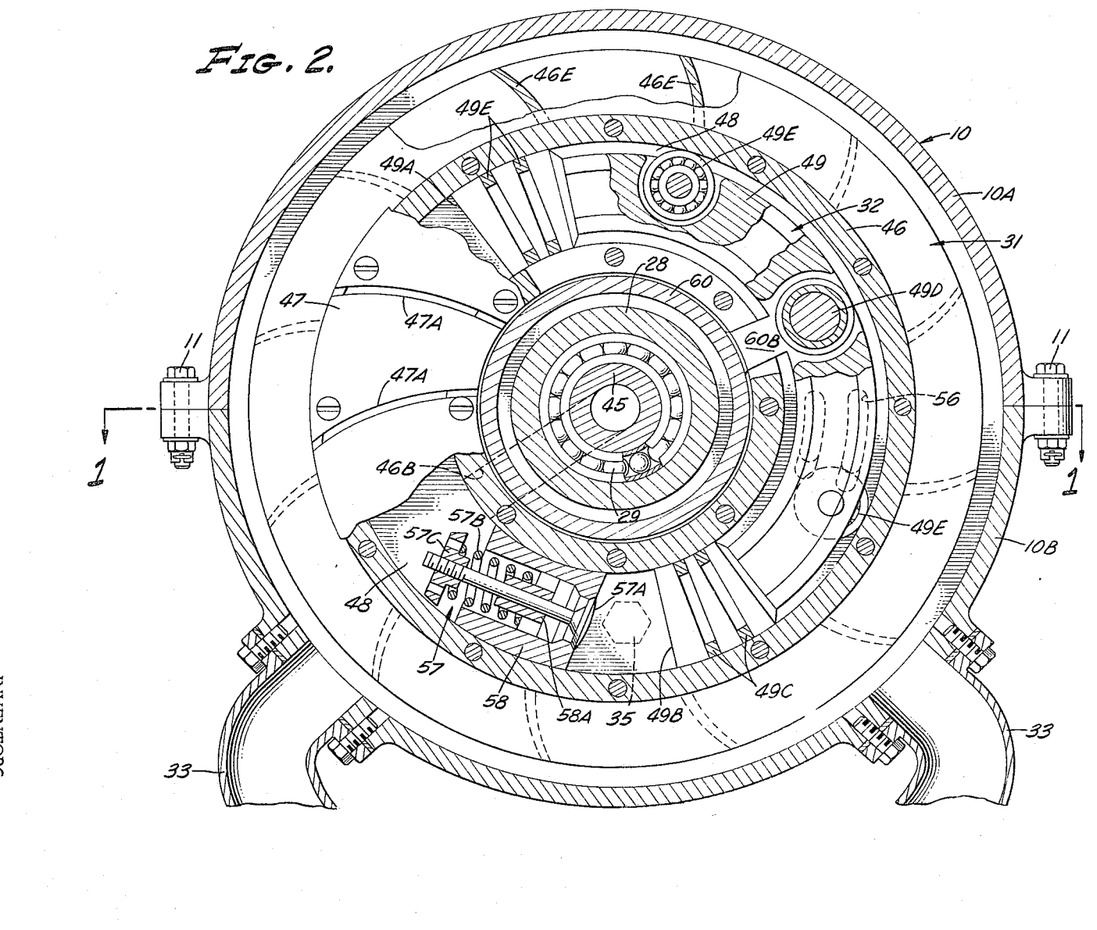
FIGS. 2 and 3 are sectional views taken substantially as indicated by lines 2—2 and 3—3, respectively, in FIG. 1.

The engine has a stationary housing or casing 10 which as seen in FIG. 2 includes two complementary casing parts 10A and 10B bolted together by a series of bolts 11 extending through aligned apertured portions in ears formed on such parts. Also, as seen in FIG. 1, the casing 10 is provided with four apertured mounting flanges 12 through which mounting bolts 13 extend for stationarily mounting the casing 10.

Internally of housing 10 are integrally formed supporting ribs 16, 17, 116, 117 (FIG. 1) to which plates 20, 21 and plates 120, 121 are bolted, such plates 20, 21 being integrally formed with a cylindrical support 25 having a shouldered portion 25A and the plates 120, 121 being integrally formed with a cylindrical support 125 having a shouldered portion 125A. A spacer ring 27 is on support 25 as is also a ring 28 having both an internally and externally shouldered portion engaged respectively by the outer and inner race member of bearings 29 and 30 which are used, as described later, to rotatably support a corresponding combined shaft-cylinder assembly 31 and a piston assembly 32 for relative movement with respect to each other. Likewise, on the right side in FIG. 1, a spacer ring 127 is on support 25 as is also a ring 128 having both an internally and externally shouldered portion engaged respectively by the outer and inner race member of bearings 129 and 130 to rotatably support the previously mentioned shaft-cylinder assembly 31 and a piston assembly 132.

The casing 10, as shown in FIG. 2, is provided with two peripherally spaced apertured portions which serve to intercommunicate the inner portion of casing 10, acting as manifold, to exhaust gas or fluid lines or conduits 33 bolted to casing 10.

Figure 3:
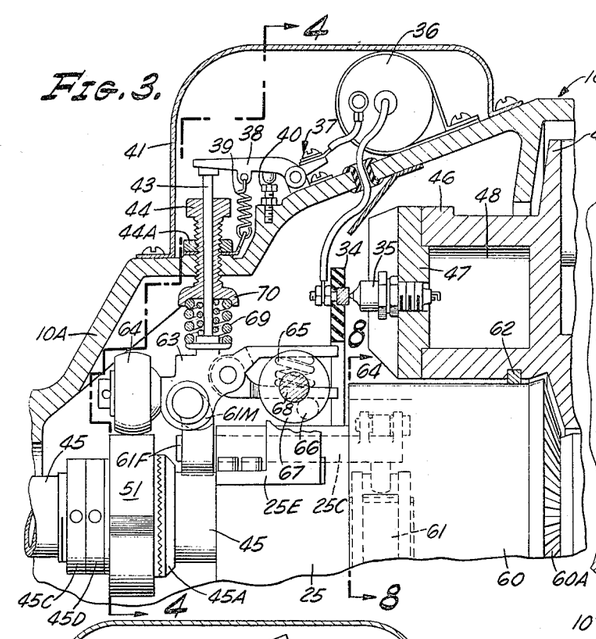

Mounted stationarily on casing 10 are two insulated slip ring assemblies 34, 134 (FIG. 1) secured by corresponding bracket members 34A, 134A, these slip rings being at all time in frictional engagement with the insulated electrode of a corresponding spark plug 35, 135 each mounted on the previously mentioned rotatable shaft-cylinder assembly 31, or may be spaced slightly therefrom to produce a spark gap between the same. Each of these spark plugs is connected in a separate conventional ignition circuit involving a coil, a timed switch and a capacitor, as indicated in FIG. 3, wherein ignition coil 36 has its high voltage terminal connected through slip ring 34 to spark plug 35 with a low voltage terminal of coil 36 connected to an ungrounded contact of a switch 37, the switch 37 having a contact mounted on arm 38 which is urged by spring 39 against a cam follower rod 43 slidably mounted in a bushing 44 threaded in casing 10 and which is pivoted on a pivot 40 adjustably mounted on casing 10 for adjustment of so-called dwell time, i.e., the time during which the ignition circuit is closed during one cycle of operation of the engine. Access may be had to these electrical components for adjustment and replacement upon removal of cover 41 on casing 10. A like ignition circuit including a corresponding ignition switch is provided for energizing the other spark plug 135.

Also the casing 10, as seen in FIG. 1, has cylindrical end portions in which bearings 42, 142 are fitted, and these bearings as well as the two previously mentioned bearings 29, 129 rotatably support the shaft-cylinder assembly 31 described under the next heading.

Shaft-cylinder assembly

The shaft-cylinder assembly 31 is rotatably supported in the casing 10 and includes in general the main shaft 45 and a cylinder housing 46 rotatable therewith about the axis of shaft 45, the housing 46 and the two housing rings 47, 147 secured thereto defining a pair of coaxial circumferentially extending cylinders 48, 148 within which corresponding complementary arcuate shaped pistons 49, 149 of the corresponding piston assembly 32, 132 are movable. One of such pistons is shown perhaps more clearly in FIG. 2 and the other piston is of identical construction. It is noted again that both the cylinder housing 46 and pistons 49, 149 are movable with respect to the stationary casing.

The shaft 45, as seen in FIG. 1, has keyed thereto an annular flanged coupling member 50 with the flanged portion thereof being apertured for connection to a load driven by the engine which may include a flywheel (not shown).

Shaft 45 has mounted thereon two independently adjustable cam members 51, 151 each having two diametrically disposed lobe portions as typified by lobe portions 51A, 51B (FIG. 4) for effecting opening and closing of the ignition switch 37 and a corresponding switch for the complementary right-hand unit in FIG. 1 twice per shaft revolution. These cam members 51, 151 each have annular toothed portions mating with corresponding toothed portions on shaft flanged portions and are held in that position by a corresponding pair of locking rings 45C, 45D and 45E, 45F each threaded on shaft 45.

Shaft 45 has a generally centrally located enlarged hub portion 45G into which one end of each of a pair of shaft pins 52, 53 extends, the other ends of these pins 52, 53 being secured to the cylinder housing 46. These shaft pins 52, 53 also rotatably support a corresponding gear 54, 55 of a differential system used as described later in producing independent relative movement of each of the pistons 49, 149 in and with respect to the rotating cylinder housing 46.

The cylinder housing 46, as seen in FIG. 1, includes an annular enlarged grooved portion 46A having internal spaced fin portions 46E serving as an exhaust gas conduit, the same being in communication with the annular cylinders 48, 148 through corresponding housing apertured portions 56, 156 which define exhaust ports for cylinders 48, 148, respectively. It is noted that this enlarged grooved portion or exhaust gas conduit 46A extends radially outwardly into an internal annular enlarged grooved portion of casing 10 defined by spaced casing rib portions 10C, 10D so that exhaust gases are diverted to pass through a space between the casing grooved portion 46A and the spaced ribs 10C, 10D and over the cylinders 48, 148 to heat them. These exhaust gases after passage over the cylinders are subjected to a fan action produced by fin or fan elements 47A, 147A circumferentially spaced and mounted on the cylinder housing or cover rings 47, 147, respectively, which function to propel the exhaust gases out through the previously mentioned exhaust gas outlets or conduits 33 (FIG. 2).

Figures 6, 7:
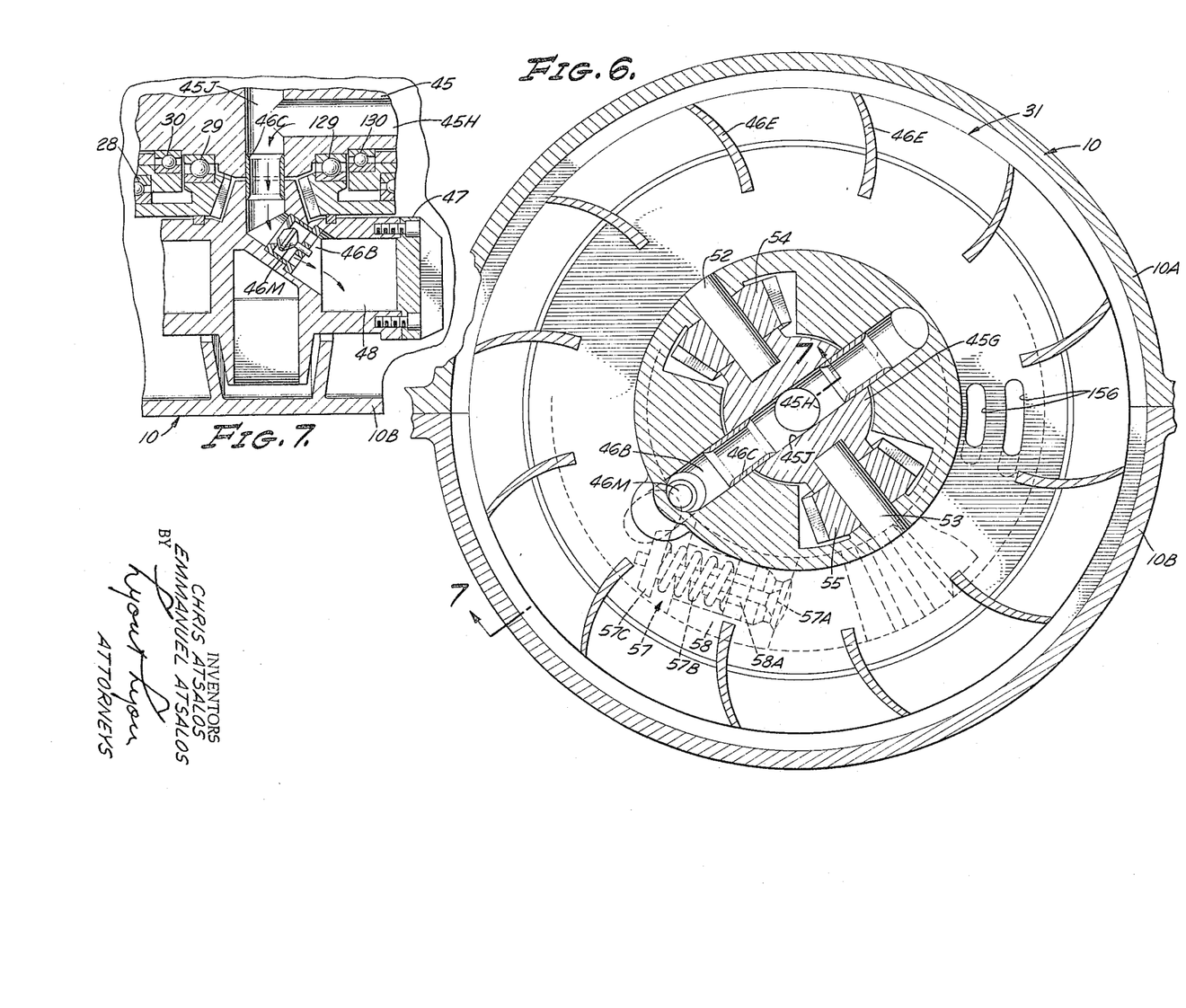
FIG. 6 is a sectional view taken substantially as indicated by lines 6—6 in FIG. 1.
FIG. 7 is a sectional view taken substantially as indicated by lines 7—7 in FIG. 6.

Inlet gas is introduced through a hollow portion 45H of shaft 45, such hollow portion having one of its ends in communication with an enlarged chamber 10E in one end of casing 10 (FIG. 1) serving generally as a manifold, the other end of the hollow portion 45H terminating at the hub portion 45G through which a communicating radial bore 45J (FIG. 7) extends to convey inlet gas mixture to the cylinders 48, 148 via angled passageways typified by the angled passageway 46B in cylinder housing 46, it being noted that there is a sealing sleeve 46C between passageways 45J and 46B and that there is a check valve 46M in passageway 46B which allows fuel to flow from shaft 45 to cylinder 48, but prevents reverse flow.

Each cylinder 48, 148 contains a pressure operable valve 57, 157 each of identical construction and typified by the construction shown in FIG. 2 wherein the valve 57 has its seat formed at one end of the passaged valve body 58 which is secured inside the cylinder housing 46, the valve body 58 having an internal apertured spider 58A that provides a guide for the stem of the movable valve closure member 57A. A coil compression spring 57B has one of its ends seated on spider 58A and the other one of its ends seated against a flanged member 57C threaded on the valve stem to provide an adjustment for the pressure at which the normally closed valve 57 is opened as described later.

The piston assembly

The piston assemblies 32, 132 are rotatably supported for independent and intermittent movement in the revolving cylinder housing 46 on the outer race of the previously mentioned bearings 29, 129 and also on the outer race of bearings 59, 159 (FIG. 1).

The assembly 32 includes a modified ring or drum member 60, and the assembly 132 includes a modified ring or drum member 160, the drum members 60 and 160 being rotatably supported on the bearings 29, 59 and 129, 159. Each of these drum members 60, 160 is formed with a corresponding bevel ring gear 60A, 160A each meshing with the previously mentioned tapered bevel gears 54, 55 rotatably supported on the corresponding shaft pins 52 and 53 that serve also to interconnect the power output shaft with the rotatable cylinder housing 46 so as to achieve a differential system for purposes described later.

As seen in FIG. 1, the drum members 60, 160 are each formed with a radially extending connecting rod portion 60B, 160B which extend through a slotted wall portion 48A, 148A of corresponding cylinders 48, 148 to provide a journalled connection with the individual pistons 49, 149 each of which is constructed as typified by the construction shown in FIG. 2 wherein the piston 49 extends an angular distance somewhat greater than 180 degrees from one end 49A thereof to its other end 49B. Each of such ends 49A, 49B are recessed to provide sealing elements 49C which frictionally engage the inner wall of cylinder 48 to provide a seal therebetween. An intermediate portion of piston 49 is connected to the drum connecting rod portion 60B using a wrist pin 49D. Also, as illustrated, two bearings 49E are rotatably supported on piston 49 with their outer race members contacting an inner wall portion of arcuate cylinder 48.

As seen in FIG. 1, the individual drum members 60, 160 each have an inner cylindrical brake drum surface 60B, 160B for cooperation with a corresponding brake element 61, 161 which, as described later, are each individually cam actuated to establish a braking condition wherein then the cylinder housing 46 (constantly rotating) moves relative to the braked piston for the purposes described later.

As seen in FIG. 1, seals 62 and 162 may be interposed between the rotating cylinder housing 46 and the corresponding individual drum members 60, 160.

The piston braking system

Each piston 49, 149 is alternatively braked or retarded twice per revolution of output shaft 45 and the cylinder housing 46 rigidly connected thereto using the following construction now described in relation to piston 49, it being understood that there is a corresponding construction for the brake of piston 149.

Figure 4:
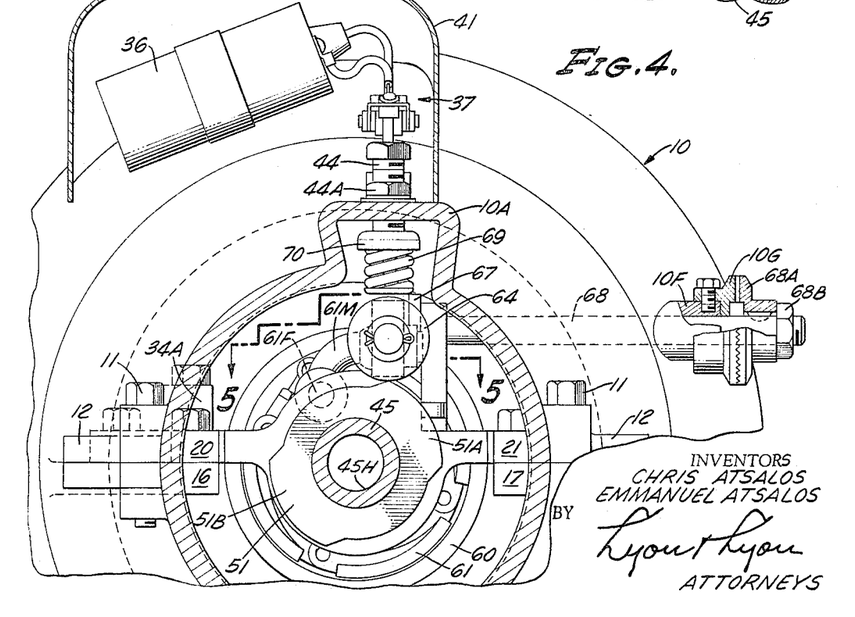
FIG. 4 is a sectional view taken substantially as indicated by lines 4—4 in FIG. 3.
Figure 5:
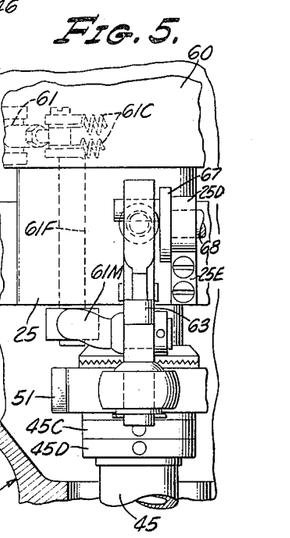
FIG. 5 is a sectional view taken substantially as indicated by lines 5—5 in FIG. 4.
Figure 8:
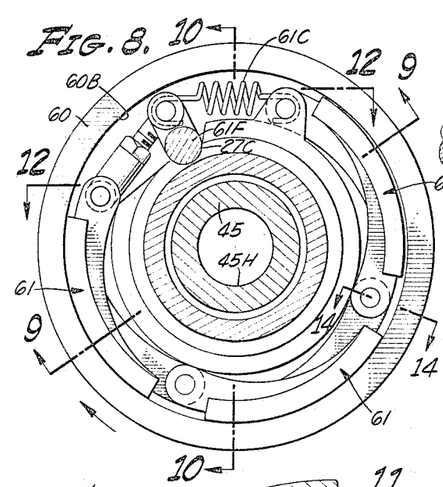
FIG. 8 is a sectional view taken substantially as indicated by lines 8—8 in FIG. 3.
Figures 9, 10:
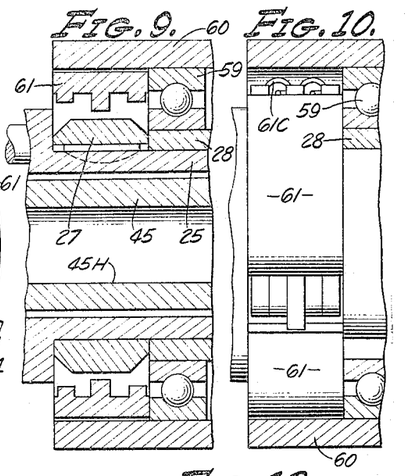
FIGS. 9 and 10 are sectional views taken substantially on corresponding lines 9—9 and 10—10 in FIG. 8.
Figure 11:
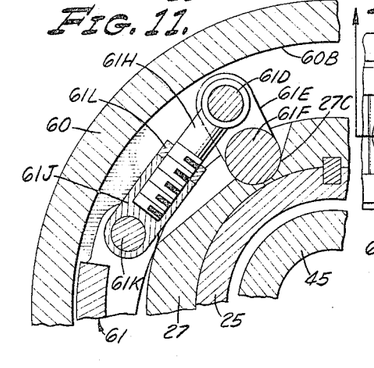
FIG. 11 is a sectional view taken substantially on line 11—11 of FIG. 12.
Figure 12:
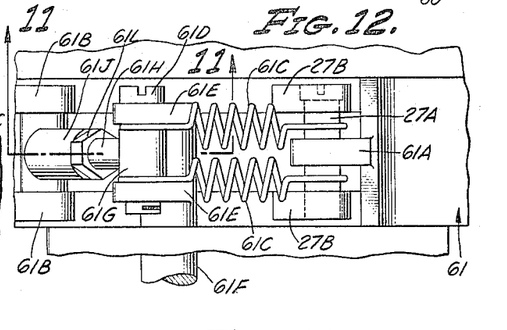
FIG. 12 is a sectional view taken substantially on line 12—12 of FIG. 8.
Figure 13:
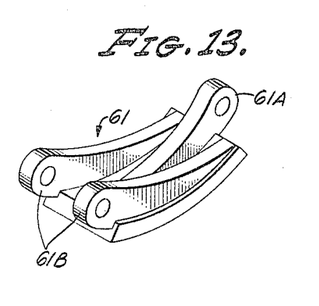
FIG. 13 is a perspective view of a brake element shown in FIG. 8.
Figure 14:
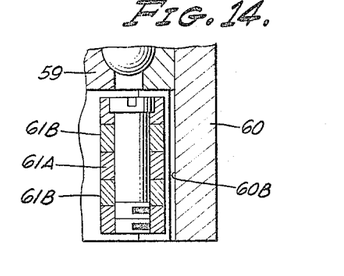
FIG. 14 is a sectional view taken substantially as indicated by line 14—14 in FIG. 8.

The brake for piston 49 is illustrated as including three articulated brake shoes 61 (FIGS. 8–13) frictionally engageable with the brake drum 60B, such brake drum being a part of the piston assembly 32 (FIG. 1). It is noted that each brake element 61 has, as seen in FIG. 13, one apertured arm portion 61A pin connected between adjacent spaced apertured arm portions 61B of the adjacent brake shoe in forming such articulation. One end 61A of one brake element 61, as seen in FIG. 12, is stationarily supported by a pin 27A having its ends supported on spaced ear portions 27B of the stationary ring member 27, the pin 27A also serving as an abutment for one end of each of the two tension brake springs 61C with the other end of such springs 61C being fastened to a crank pin 61D supported on arm portions 61E on brake actuating shaft 61F. Also pivotally mounted on pin 61D is a collar 61G having a threaded pin 61H integrally formed therewith, such pin 61H being threaded in one end of a T shaped sleeve member 61J which is pivotally mounted on a pin 61K passing through aligned apertured portions of brake element portions 61B. The brake is thus adjustable and the adjustment once made is secured by locking nut 61L. The brake actuating shaft 61B, as seen in FIGS. 8, 11 and 3, extends through a bore 25C in stationary support 25 and into a grooved portion 27C of ring 27 and has one of its ends secured to one end of a curved arm 61M (FIG. 4) pivotally mounted on a cam follower arm 63 which has a cam roller 64 engaging its cam 51. This arm 63 has pivotally secured thereto an arm 64 with a coil compression spring 65 acting between arm 63 and arm 64 to press the arm 64 against an adjustable pin 66 on a disk 67 on timing adjustment shaft 68 which, as seen in FIGS. 4 and 5, extends through a bearing member 25D on bracket 25E on support 25 and also extends through a bushing portion 10F of stationary casing 10. This bushing portion 10F has a circularly toothed disk 10G cooperating with a toothed disk 68A keyed on shaft 68. A locking nut 68B on shaft 68 releasably secures the two toothed disks together to allow adjustment of the shaft 68 and hence the adjustment of pin 66 which provides an adjustable fulcrum for the lever system involving arm 63 and the spring urged arm 64 thereon. The cam roller 64 is urged against its cam 61 by a coil compression spring 69 having one of its ends seated on lever 63 and the other one of its ends seated in the adjustable tubular externally threaded seat or bushing 44 adjustably secured by lock nut 44A.

The previously mentioned timing switch rod 43 is slidably mounted in bushing 44, and a coil compression spring 70 acts between seat 44 and an enlarged end portion of rod 43 to maintain rod 43 in contact with cam follower arm 63.

The cam 51 is a two lobe cam with each of the two lobes thereon serving successively to operate the brake to braking condition. When the cam follower roller 64 is between the cam lobes, the brake springs 61C are effective to release the brake shoes 61. When and as the cam roller 64 rides up on a lobe, the curved arm 61M and shaft 61F secured thereto are pivoted to pivot the arm 61E and expand the brake shoes 61 against the brake drum 60B and against the action of springs 61C which are effective to return the brake shoes 61 to retracted or non-braking condition when and as the cam roller moves from engagement with a lobe portion of cam 51.

When and as the brake is thus being applied, the cam follower arm pivots about the pin 66 against the action of springs 69 and 70 to raise the rod 43 and cause the ignition switch 37 to open to thereby develop an ignition spark at spark plug 35.

Thus, for a particular piston-cylinder pair ignition is accomplished when the associated piston is braked or retarded. The cams 51, 151 for the two cylinder-piston assemblies are so adjusted on shaft 45 such that when one of the piston assemblies is braked, the other piston assembly is free to rotate and indeed rotates at a speed higher than the speed of the common cylinder housing 46 because of the gear ratio in the differential driving system involving gear 54 which has its axle rotating with the cylinder housing and its teeth meshing with ring gear portions of the piston assemblies 32, 132.

Operation

In the following explanation of the operation of the engine it should be remembered that:

(1) The cylinder housing 46 for both pistons 49, 149 constantly rotates in the same direction illustrated by arrows as rotating in the clockwise direction in FIGS. 15, 16, 19–22.

(2) The pistons 49, 149 always rotate in the same clockwise direction except, of course, when one of such pistons is braked to remain temporarily stationary.

(3) The pistons are alternately braked to produce relative movement between the pistons and the cylinder housing.

(4) Because of the greater than one to one gear ratio in the differential drive system involving the pinion gear 54 meshing with the ring gears 60A, 160A (FIGS. 17 and 18) when one of the pistons is braked, the other piston is driven at a speed greater than the cylinder housing so as to advance such other piston substantially the same distance (with respect to the cylinder housing) that it previously lost in its previous braked condition.

(5) There are two spark plug firings with respect to each piston per revolution of the cylinder housing which means that there are two cycles per revolution in each piston-cylinder assembly with each cycle involving the following phases:

(a) Gas mixture intake
(b) Compression
(c) Firing
(d) Power stroke, and
(e) Burned gas exhaust.

Figures 15, 16, 17, 18, 19, 20, 21, 22:
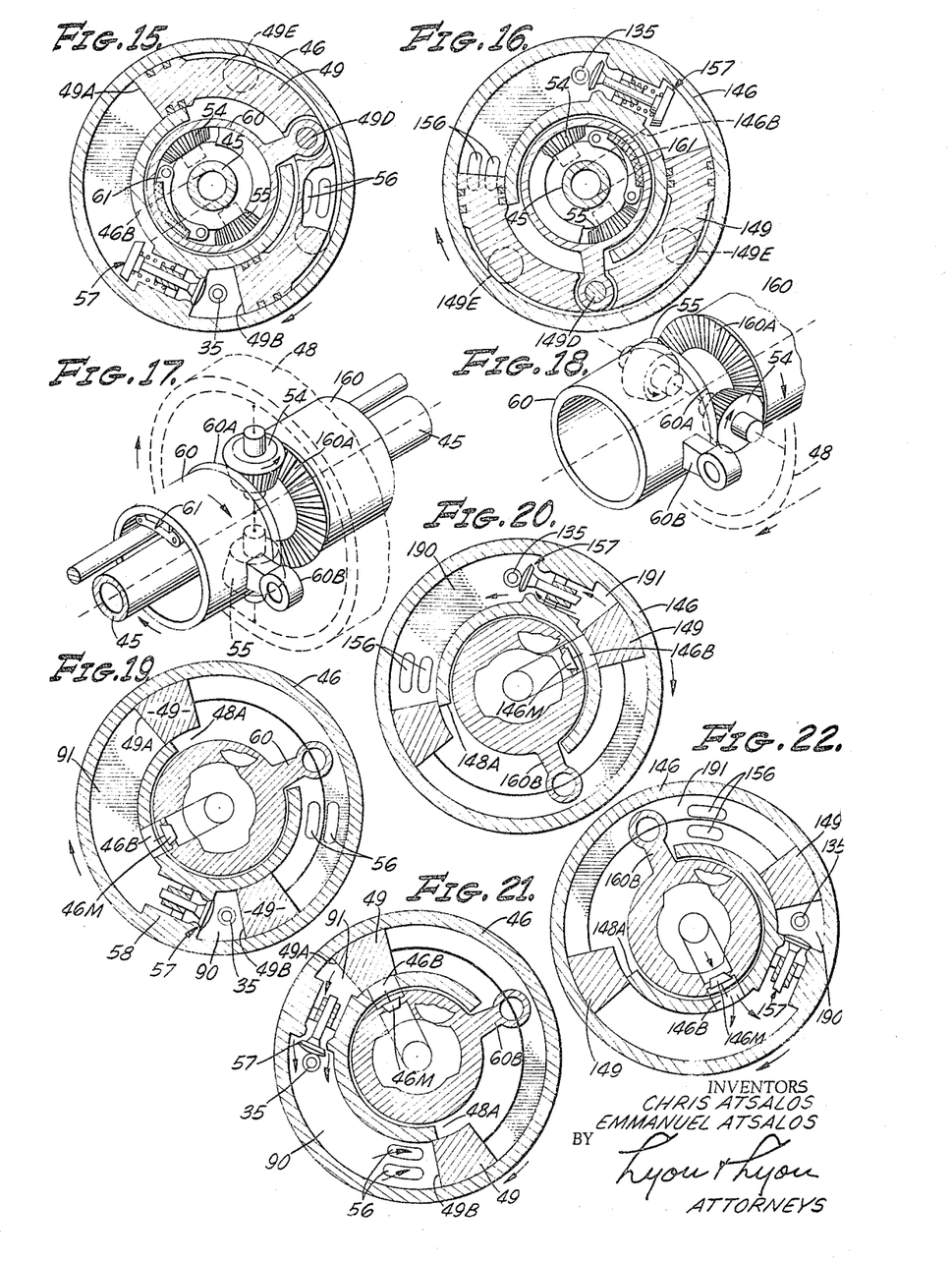
FIGS. 15–22 are in general diagrammatic illustrations showing arrangement of parts in the previous figures, FIGS. 15 and 16 showing respectively the so-called left- and right-hand piston assemblies, with the left-hand piston assembly in a locked condition and the right-hand piston assembly during one phase of its compression stroke, FIGS. 17 and 18 illustrating the action of the differential system, FIGS. 19 and 20 serving to illustrate other conditions corresponding to those in FIGS. 15 and 16, respectively, and FIGS. 21 and 22 serving to illustrate conditions when the right-hand piston assembly is locked and the left-hand piston assembly is in one phase of its compression stroke.

For convenience of explanation, as indicated in FIG. 19, reference is made to two variable volume chambers 90 and 91, the chamber 90 being defined by the annular cylinder space between the piston end 49B and valve body 58 and chamber 91 being defined by the annular cylinder space between valve body 58 and the other end 49A of piston 49 with the valve 57 being essentially a check valve that allows fluid flow only in the direction from chamber 91 to chamber 90 when a predetermined high pressure condition exists in chamber 91. Also, as illustrated in FIG. 19, there is a compressed gas mixture in chamber 90, the piston 49 is in a temporarily braked or stationary condition and the spark plug 35 is fired. In such case, the resulting burning of the gas mixture in chamber 90 produces a force against the closed valve body 58 causing the cylinder 48 to rotate in a clockwise direction during an expansion or power stroke, the piston 49 remaining stationary during such stroke until at least the exhaust ports 56 in cylinder housing 46 previously blocked or closed by piston 49 are moved into the expansible chamber 90 (FIG. 21) for exhaustion of the then burned gases therein. During such expansion of chamber 90, the other annular chamber 91 is contracted and the gas inlet port 46B in the cylinder housing 46 becomes blocked or closed by piston 49 with, however, some gas mixture in chamber 91 being entrapped and producing a pressure sufficiently high in chamber 91 to cause valve 57 to open and introduce a new fresh gas mixture to enter chamber 90 displacing any remaining burned gases through the exhaust ports 56. After or substantially contemporaneous with automatic opening of valve 57, the piston 49 is released and the other piston 149 is locked as indicated in FIG. 22. Such locking of the other piston 149 results in the piston 49 being advanced at a greater speed than the cylinder housing 46 (due to the greater than one to one gear ratio in the differential drive system involving gear 54) so that now the chamber 90 is contracted by the advancing piston end 49B which initially closes the exhaust ports 56 in the cylinder housing 46 and then defines the moving wall of a compression chamber for the entrapped fresh gas mixture then in chamber 90; and contemporaneously, the gas inlet port 46B is uncovered or opened by the other piston end 49A to place the same in communication with the expanding chamber 91, such expansion of chamber 91 resulting in suction pressures being developed which are used to introduce the fresh gas mixture into chamber 91. Such contraction of chamber 90 and expansion of chamber 91 continues until the conditions illustrated in FIG. 19 are achieved at which time the piston 49 becomes braked or locked and the spark plug 35 again ignited to start another cycle of operations. It will be observed that the opening 48A in cylinder housing 48 through which the piston rod portion 60B projects extends an angular distance somewhat greater than 90 degrees so as to allow a 90 degree movement of cylinder housing 48 in the locked condition of piston 49 during the power stroke, and then subsequently during the compression stroke (piston 49 unlocked, piston 149 locked) a 90-degree advancement of the piston 49 with respect to the moving cylinder housing 48. Thus, even though such opening 48A extends an angular distance of less than 180 degrees but somewhat more than 90 degrees, the cylinder housing 48 advances 180 degrees during one cycle of operation with two cycles of operation being accomplished in one revolution of the cylinder housing 48 and output shaft 45 connected thereto.

Consistent with the prior use of reference numerals used herein, it will be seen that corresponding elements in the so-called right- and left-hand units in FIGS. 19–22 have identical reference numerals but for the important distinction that those in the so-called right-hand unit are raised by 100; for example, piston 49 in the left-hand unit corresponds to piston 149 in the right-hand unit. This allows ready comparison between substantially contemporaneous conditions in FIGS. 19 and 20 and also substantially contemporaneous conditions in FIGS. 21 and 22. In comparing these four FIGURES 19–22, it will be seen that FIGS. 20 and 21 illustrate substantially the same condition in the left- and right-hand units; and FIGS. 19 and 22 likewise illustrate substantially the same conditions in these two units.

For further explanation of the relative directions of rotation, reference is made to FIGS. 17 and 18 which show conditions prevailing when the driving element 160 for the piston 149 is locked (FIG. 17) and conditions prevailing when the driving element 60 for piston 49 is locked. In each case, as illustrated, the piston drivers 60, 160, when free to rotate, rotate in the same clockwise direction as does the cylinder housing 48.

If desired, a fuel injection system involving a pump may be used to burn, for example, diesel fuel in which case spark plug ignition is not required.

The cams 51, 151 on each end of shaft 45 may be adjusted or replaced by similar cams for regulation of compression ratio whereby the engine may be adjusted to burn various fuels and to operate on steam.

In the above operation it is noted that movement of the piston 49 causes an enlargement of chamber 91, thus creating a vacuum which opens check valve 46M, the latter being normally held against a seat which defines an inlet port. Thus, the gases may enter chamber 91, but such gases are entrapped upon subsequent closing of check valve 46M upon the contraction of chamber 91 so that there is no loss of gases through the inlet port.

Figure 23:
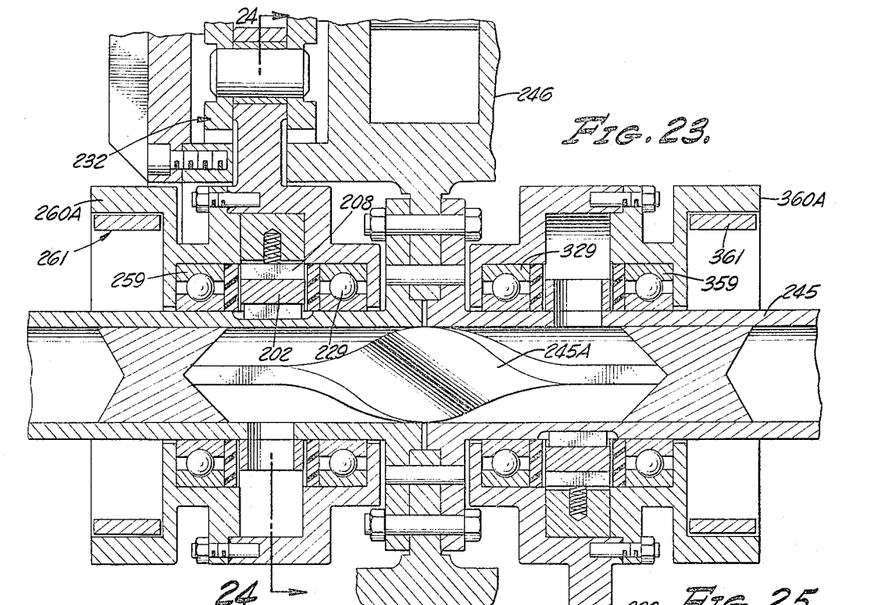
FIGS. 23, 24 and 25 illustrate a modification, with FIG. 23 being a sectional view taken substantially on line 23—23 of FIG. 24, and with FIG. 24 being a sectional view taken substantially on line 24—24 of FIG. 23, and FIG. 25 showing the complementary relationship of parts in the right-hand unit when the left-hand unit is in the condition illustrated in FIG. 24.
Figure 24:
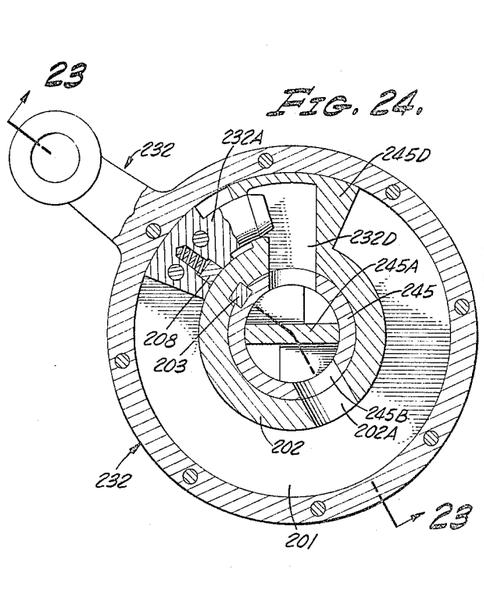
Figure 25:
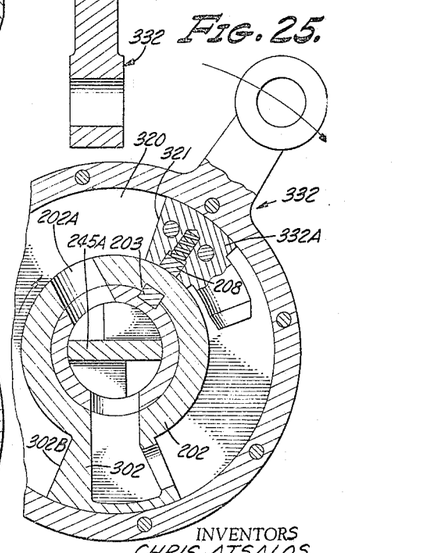

*Modification in FIGS. 23–25*

Instead of a differential gear system, a hydraulic system may be used to produce movement of one of the pistons with respect to the locked or braked piston and at a speed greater than the speed of the cylinder housing as now described in connection with FIGS. 23–25, wherein the two piston assemblies 232, 332 have a fluid coupling between the two, such fluid coupling involving a hollow portion of the output shaft 245 having a vane 245A therein.

The cylinder housing 246 is bolted to the shaft 245 to rotate therewith as in the previous figures, and fuel is introduced into the two cylinders of housing 246 by means not shown, although such means may involve, for example, a fuel entrance tube coaxial within and on shaft 245 and in communication with inlet ports of the cylinders, as described previously, but such tube is omitted from the drawings for purposes of more clearly illustrating the present modification.

The assembies 232, 332 each include a corresponding brake drum 260A, 360A cooperating with a brake shoe 261, 361, respectively, and these assemblies are rotatably supported on shaft 245 using bearings 229, 259 and 339, 359, respectively.

The assemblies 232, 332 each include a corresponding construction and, as typified by the construction of assembly 232, the same is formed with a generally annular oil chamber 201 which is defined in part by a form of sleeve member 202 secured on shaft 245 by a key 203. This member 202 has a radial opening 202A aligned with a radial opening 245B in shaft 245 and has formed therewith a radially extending cylinder portion 245D for receiving a piston member 232A secured to assembly 232, the cylinder portion having a passageway 232D therethrough in communication with the hollow portion of shaft 245. A spring urged seal 208 is between the elements 232A and 202.

FIG. 24 illustrates relationship of parts during the power stroke with the piston assembly 232 then being in a locked condition and the shaft 245 rotating in a clockwise direction. Fluid is then displaced through the aligned ports 202A, 245B, and such fluid flows through shaft 245 to expand the chamber 320 in the other piston assembly, such chamber 320 being defined by the annular space between surface 321 on piston element 332A and the surface 202E on the cylinder element 302. The piston assembly 332 when not braked tends to move because of frictional forces in the same direction as the shaft, hence there is expansion of this particular chamber 320 causing the piston assembly to move in a clockwise direction faster than the shaft and causing a compression of the fuel in the cylinder for that particular assembly. The continued presence of the cylindrical portion of piston 232A in the cylinder member 245D assures this fluid displacement and movement of the other piston assembly 232.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. An engine of the character described, including a shaft, a cylinder housing secured to said shaft for rotation therewith, said housing including a first and a second cylinder portion, a first and a second piston member in said first and second cylinder portion respectively, first means for alternately arresting movement of said piston members with respect to said cylinder housing, a second means synchronized with said first means for alternately advancing said piston members with respect to said cylinder housing, said first and second means operating such that when one of said piston members is arrested the other is advanced, said second means including a fluid coupling between said piston members.

2. In an engine of the character described, a rotating cylinder rotatable about an axis, an annular piston rotatable about said axis in said cylinder and having two end walls defining a cavity with said cylinder, said cylinder having a wall portion extending into said cavity and dividing said cavity into two chambers, and a check valve in said wall portion for intercommunicating said chambers, said cylinder having a fuel inlet port communicable with one of said chambers, said cylinder being connected to a shaft rotating about said axis and said shaft having a passageway therein communicating with said fuel inlet port.

3. In an engine of the character described, a rotating cylinder rotatable about an axis, an annular piston rotatable about said axis in said cylinder and having two end walls defining a cavity with said cylinder, said cylinder having a wall portion extending into said cavity and dividing said cavity into two chambers, and a check valve in said wall portion for intercommunicating said chambers, including means for preventing rotation of said piston with respect to said cylinder to enlarge one of said chambers and to contract the other of said chambers, and means synchronized with said means for advancing said piston with respect to said cylinder to contract said one chamber and enlarge said other chamber.

4. An engine as set forth in claim 3, including means operated to produce ignition in said other chamber upon operation of said preventing means.

5. An engine as set forth in claim 4 in which said cylinder has a gas inlet port in communication with said one chamber when said preventing means is operated.

6. An engine as set forth in claim 4 in which said ignition producing means includes a stationary slip ring for a spark plug on said cylinder.

7. An engine as set forth in claim 4 in which said ignition producing means and said preventing means are each operated by a single cam on a shaft rotating with said cylinder.

8. An engine as set forth in claim 3 in which said cylinder has an exhaust port covered by said piston when said preventing means is operated.

References Cited by the Examiner

UNITED STATES PATENTS

| | | | |
|---|---|---|---|
| 1,250,859 | 12/1917 | Grimmett et al. | 123—11 |
| 1,487,829 | 3/1924 | Arrighi | 123—11 |
| 1,923,744 | 8/1933 | Petrilli | 123—11 |
| 2,280,967 | 4/1942 | Nelson | 123—11 |

FOREIGN PATENTS 27,028    1913    Great Britain.

MARK NEWMAN, *Primary Examiner.*

F. T. SADLER, *Assistant Examiner.*